Patented Jan. 12, 1937

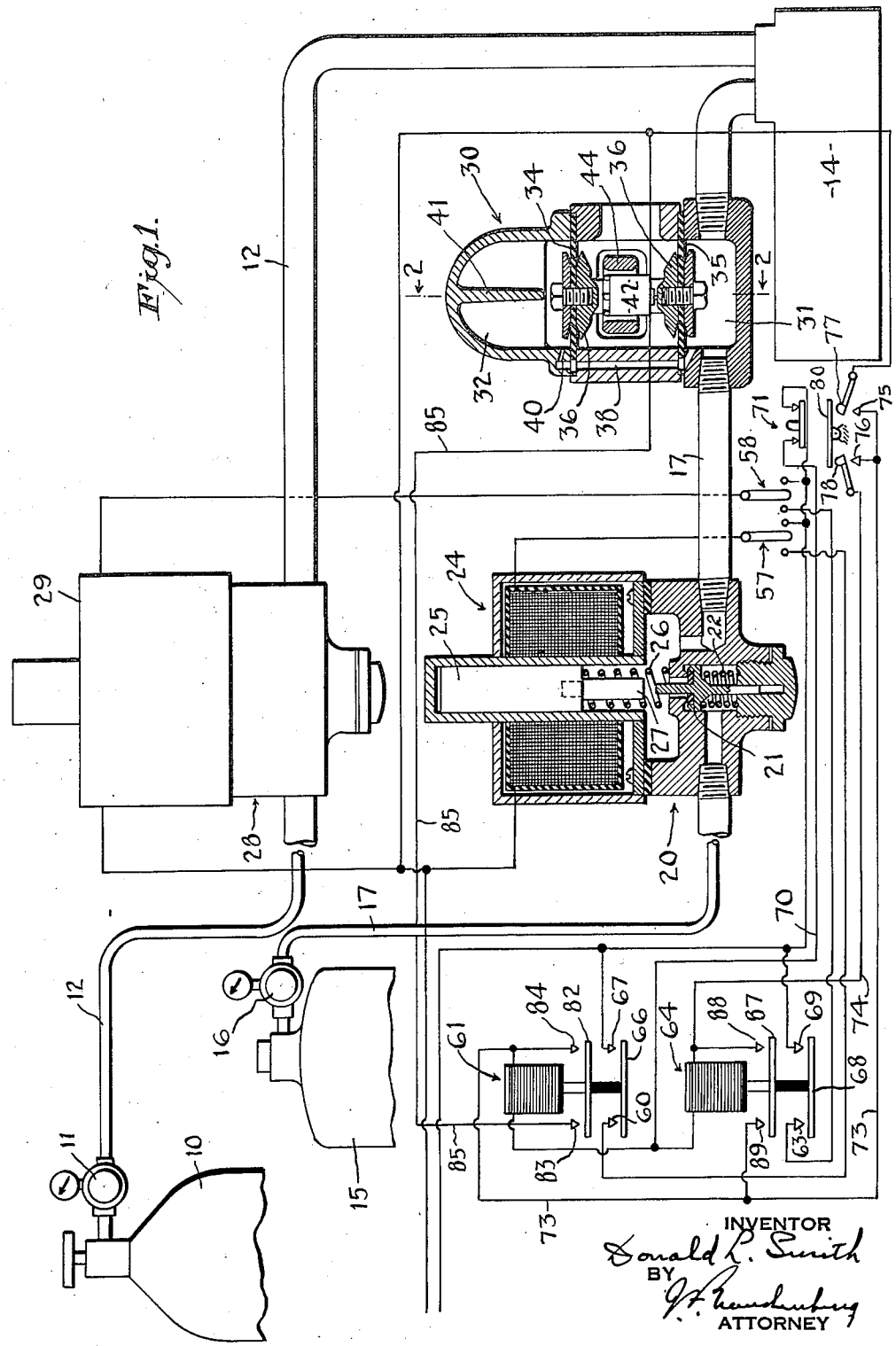

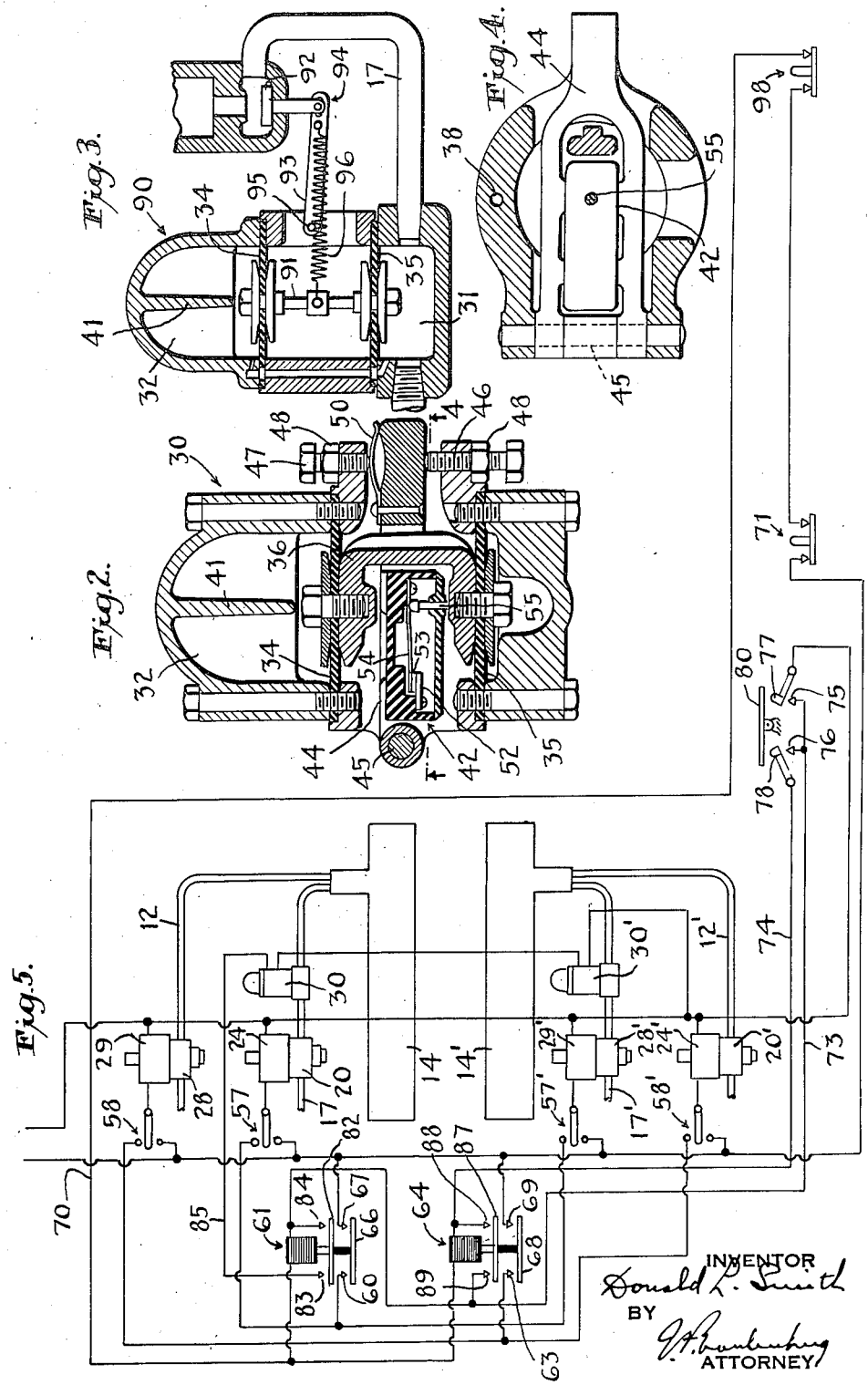

2,067,622

UNITED STATES PATENT OFFICE 2,067,622

VALVE CONTROL APPARATUS

Donald L. Smith, Caldwell, N. J., assignor to Air Reduction Company, Incorporated, New York, N. Y., a corporation of New York Application April 4, 1935, Serial No. 14,657

10 Claims. (Cl. 158—27.4)

This invention relates to valve apparatus for controlling the flow of fluid through pipes or conduits, and more particularly to valve apparatus for the protection of oxy-fuel-gas supply lines and acetylene lines.

It is an object of the invention to provide improved control apparatus which operates in response to a sudden change in pressure in a conduit to close a valve and shut off the flow of fluid through the conduit. The change in pressure may be a sudden increase caused by an explosion of acetylene, or flash-back at a burner or torch, or may be a sudden decrease caused by the bursting of a pipe, or hose, or by injury to some apparatus resulting in excessive leakage of the gas.

Another object of the invention is to provide improved apparatus for preventing damage from flash-backs and back-fires of oxy-fuel-gas burners or torches. In this specification the term "flash-back" is used in a broad sense to include situations in which the flame flashes into the burner or torch tip and then ceases to burn, leaving the torch extinguished, or continues to burn within the torch, but without traveling back through a gas conduit, and to include back-fires in which the flame does travel back through a gas delivery conduit.

According to one feature of the invention, the supply of gas to the torch is automatically shut off in the event of a flash-back, and continued burning of gas inside the torch, or travel of a flame back through a gas conduit, becomes impossible.

Another object of the invention is to provide means for preventing flash-backs at the time the torch is lighted. If the oxygen supply is turned on before the fuel gas, and the torch is lighted as soon as the fuel gas begins to flow, the excess oxygen in the mixture causes a flame propagation which is at a higher rate than the gas flow through the torch orifices, with the result that the flames flash back into the torch. If the oxygen and fuel gas are turned on at the same time, there may be excess oxygen in the first gas to issue from the torch. If this is not the case, or if the lighting is delayed for an instant until the mixture becomes correct, there is little danger of flash-backs, but the gas lights with an objectionable explosion. This invention insures against flash-backs at the time the torch is lighted by preventing the oxygen from being supplied to the torch ahead of the fuel gas, or by requiring that the fuel gas control valve be opened ahead of the oxygen control valve.

Another object of the invention is to provide a novel shut-off valve for controlling the supply of gas to a torch in response to the movement of switches in electric control circuits.

Other objects, features and advantages of the invention will appear or be pointed out as the specification proceeds.

In the accompanying drawings, forming part hereof:

Fig. 1 is a view, partly diagrammatic and partly in section, showing torch control apparatus embodying the invention;

Fig. 2 is an enlarged sectional view on the line 2—2 of Fig. 1;

Fig. 3 illustrates a mechanical valve operating mechanism which can be employed in place of the electric control device shown in Figs. 1 and 2;

Fig. 4 is a sectional view taken on the line 4—4 of Fig. 2; and

Fig. 5 is a diagrammatic view showing an embodiment of the invention for controlling two torches.

Oxygen from a storage cylinder 10 is delivered through a regulator 11 and conduit 12 to a torch 14. Fuel gas is supplied to the torch from a storage cylinder 15 through a regulator 16 and conduit 17. The storage cylinders are representative of sources of gas. The torch 14 is illustrated diagrammatically as a multi-flame torch, but the invention is applicable to any type burner or torch in which oxygen and fuel gas are mixed and discharged through flame jet orifices.

The conduit for the fuel gas includes a shut-off valve 20 containing a valve element 21. This valve closes in the direction of the gas flow and is normally held closed by a spring 22 and the upstream pressure of the gas.

A solenoid 24, connected to the shut-off valve 20, operates a plunger 25. When the solenoid is not energized, the plunger 25 is held in an elevated position by a spring 26. A stem 27 extends downward from the solenoid to within a short distance of the stem of the valve element 21. When the solenoid 24 is energized, it draws the plunger 25 downward against the force of the spring 26 and causes the stem 27 to move into contact with the stem of the valve element 21 and displace the stem so that the valve is moved into open position.

The force required to open the valve is greater than the force required to hold it open because the gas pressure below the valve element 21 resists opening of the valve, but this pressure is largely counterbalanced by the gas pressure on the other side of the valve element after it is moved into open position and gas is flowing around it. The gap between the stem of the valve element 21 and the lower end of the stem 27 permits the plunger 25 to start moving and gain considerable momentum before it encounters the resistance offered by the valve element. The plunger stem 27 strikes a hammer blow against the stem of the valve element 21 to impart the initial movement to the valve element. This feature of the valve operating means makes possible the use of a smaller solenoid than would be required if there were no lost motion between the plunger and valve element. The force exerted by the solenoid is greater if the stem 27 is made of non-magnetic material.

A safety device 30 includes a conduit pressure chamber 31 and a counterbalancing pressure chamber 32. The chamber 31 forms a part of the conduit through which the fuel is delivered to the torch. A diaphragm 35 forms the top wall of the conduit pressure chamber 31. A similar diaphragm 34 forms the bottom wall of the counterbalancing pressure chamber 32. The diaphragms 34 and 35 have their center portions clamped to a connector 36 so that any movement of either diaphragm is transmitted to the other.

The chambers 31 and 32 communicate through a conduit 38, which has a restricted portion 40 for causing a time lag between a pressure change in the chamber 31 and a corresponding pressure change in the counterbalancing pressure chamber. The length of this time lag depends on the size of the restricted portion 40 of the conduit 38 and on the capacity of the counterbalancing pressure chamber 32. An abutment 41 limits the upward movement of the diaphragms in case of a very sudden excessive pressure rise in the conduit chamber 31.

An electric switch 42 is supported between the diaphragms 34 and 35 by an arm 44, which is best shown in Figs. 2 and 4. The arm 44 is supported at one end by a shaft 45, which extends through the end of this arm and through the casing of the safety device 30. The arm 44 has a limited pivot movement about the axis of the shaft 45. The other end of the arm 44 extends between opposing limit screws 46 and 47, which thread through portions of the safety device 30 and are held in position by lock nuts 48.

The free end of the arm 44 rests on the lower limit screw 46, and a leaf spring 50, which is fastened to the arm, is confined between the arm and the upper limit screw 47. The arm does not move during the ordinary operation of the safety device, but the spring will yield and permit the switch and diaphragm to rise if the upward pressure of the diaphragm 35 becomes so great that it is likely to damage the switch. The screw 46 is adjusted to bring the switch 42 into proper relation with the diaphragm 35 and connector 36. The screw 47 is adjusted to obtain sufficient tension in the spring 50 to insure operation of the switch 42 before the spring yields.

The switch 42 is shown in Fig. 2 as a simple form of spring-operated switch with a fixed contact 52 connected to the switch housing, which is of insulating material. A movable contact 53 is carried at one end of a leaf spring 54 and the other end of this leaf spring is secured to the switch housing. The tension of the spring 54 normally holds the contact 53 against the contact 52. A push rod 55 extends through the switch housing and contacts with the spring 54 close to its fixed end so that a small movement of the push rod 55 causes a much larger movement at the contact end of the spring and moves the contacts apart to open the circuit. In order that the switch may be longer wearing, a snap-action switch may be employed. The current which passes through the switch is small, however, since it is a relay operating current and not that supplied to the solenoids.

Fig. 1 shows the connection of the switch 42 with the control circuits. The solenoids 24 and 29 receive power through switches 57 and 58. Each of these switches is of the single-pole, double-throw type and when closed to the right directly connects its solenoid with the power line so that the solenoid remains energized regardless of the position of the control apparatus. When the switch 57 is closed to the left, the solenoid 24 is connected with the lower left-hand contact 60 of a relay 61. Closing the switch 58 to the left connects the solenoid 29 with the lower left-hand contact 63 of a relay 64. When not energized, the relays 61 and 64 remain in the open positions shown in Fig. 1.

When the relay 61 is energized, a contact bar 66 closes the circuit between the contact 60 and a contact 67 which connects with the power line. A similar contact bar 68 closes the circuit between the contact 63 and a contact 69 connected to the power line.

Both of the relays 61 and 64 are connected with a conductor 70, which connects with the power line through a normally-closed switch 71. The other sides of the relays 61 and 64 are connected with conductors 73 and 74, respectively. These conductors connect with a starting switch, which includes fixed contacts 75 and 76, movable contacts 77 and 78, and a plate 80 which is pivoted at its center so that it can be rocked. The attendant rocks the plate 80 in a clockwise direction to move the contact 77 against the contact 75. The contact 75 is connected to the conductor 73, and the contact 77 connects with the return side of the power line so that the power circuit through the relay 61 is completed and the relay energized when the contacts 75 and 77 are brought together.

When the attendant rocks the plate 80 counterclockwise, the contact 78 is moved against the contact 76. These contacts 78 and 76 connect with the conductors 74 and 73, respectively, but the power circuit of the relay 64 is not completed when these contacts are brought together unless the relay 61 is already closed.

The movable contacts 77 and 78 spring away from the fixed contacts 75 and 76 unless held against them by the plate 80. This plate comprises a manual switch-operating means which prevents the closing of the circuits through the contacts 77 and 78 at the same time.

When the relay 61 is energized, it moves a contact bar 82 across contacts 83 and 84, and completes a power circuit through the switch 42 which is connected to the contact 83 by a conductor 85. The circuit from the relay 61 through the switch 42 is a parallel circuit to that through the conductor 73 and contacts 75 and 77, and the relay 61 therefore remains energized after the circuit through the contacts 75 and 77 is broken.

The power circuit which initially energizes the relay 64 extends from the power line through the switch 71, conductor 70, relay 64, conductor 74, contacts 78 and 76, conductor 73, contact 84, contact bar 82, contact 83, conductor 85, and switch 42. After the relay 64 has been energized it moves a contact bar 87 against contacts 88 and 89 to close a circuit between these contacts and connect the relay 64 with the conductor 73 by a circuit parallel to that through the contacts 76 and 78 so that when the attendant releases the plate 80, and the contact 78 moves away from the contact 76, the relay 64 will remain energized.

Fig. 3 shows a modified form of the invention in which the safety device 90 controls the gas shut-off valve through a mechanical connection instead of an electric control. Most of the safety device 90 is similar in construction to the safety device 30, and corresponding parts are indicated by the same reference characters. A connector 91 is secured to the diaphragms 34 and 35. A valve 92, controlling the supply of gas through the conduit 17, is connected to one end of a link 93 by a pin and slot connection 94. The other end of the link 93 is connected to the casing of the safety device 90 by a pivot connection 95. A spring 96 is connected at one end with the link 93 and at its other end with the connector 91 at a point which locates the center line or line of pull of the spring 96 just below the axis of the pivot connection 95 when the pressure in the chambers 31 and 32 is substantially the same. With the spring 96 in such position, it tends to rotate the link 93 clockwise and the link holds the valve 92 open.

A sudden increase in pressure in the conduit chamber 31 causes the diaphragm 35 to raise the connector 91, and the end of the spring 96 which is fastened to the connector, so that the line of pull of the spring is shifted to the other side of the pivot connection 95 and the spring tends to close the valve 92. When this valve is closed, the line of force of the spring is further above the pivot 95 than its distance below the pivot when the valve is open. This construction permits a small force to raise the connector 91 and close the valve 92, and obtains a strong force from the spring 96 to hold the valve closed against the gas pressure.

Fig. 5 shows the invention applied to the control of two torches 14 and 14'. All of the apparatus which is similar to that shown in Fig. 1 is designated by the same reference characters as in Fig. 1. The oxygen and fuel gas are delivered to the torch 14' through conduits 12' and 17', respectively, which correspond to the conduits 12 and 17 of the torch 14. Shut-off valves 20' and 28' in the conduits are controlled by solenoids 24' and 29'. These valves and solenoids are similar to those shown in Fig. 1, and the solenoids are connected to the relays 61 and 64 in parallel with the solenoids 24 and 29. Switches 57' and 58' are used to connect the solenoids 24' and 29' directly to the power line or to the relays 61 and 64 of the control circuits. A safety device 30' connected in the gas line 17' and similar in construction to the safety device 30 has its switch connected in series with the switch of the safety device 30 so that opening of the switch in either of the safety devices 30 and 30' breaks the power circuit through the relay 61. The opening of the relay 61 breaks the power circuit through the relay 64. A switch 98 in series with the switch 71 serves as a remote control for cutting off the supply of gas to the torches.

The operation of the apparatus shown in Fig. 1 is as follows:

With the valves 20 and 28 closed and the switches 57 and 58 closed to the left, the attendant starts the flow of gas to the torch 14 by tilting the plate 80 in a clockwise direction to move the contact 77 against the contact 75. When these contacts come together, current flows from the power line through the closed switch 71, conductor 70, relay 61, conductor 73, and contacts 75 and 77. The relay 61 is energized and moves the contact bars 66 and 82 against their adjacent contacts.

When the contact bar 82 comes against the contacts 83 and 84, a circuit is closed from the relay 61 through the contact 84, contact bar 82, contact 83, conductor 85, and switch 42. This circuit is parallel to that through the contacts 75 and 77 and the relay 61 therefore remains energized after the attendant permits the contact 77 to move away from the contact 75.

When the contact bar 66 comes against the contacts 67 and 60, current flows from the contact 67, through the contact bar 66, contact 60, and switch 57, to the solenoid 24. The solenoid opens the valve 20 so that fuel gas can flow to the torch 14. Since the initial flow of gas into the conduit chamber 31 is likely to open the switch 42, the attendant should hold the plate 80 depressed to the right to maintain the circuit through the contacts 75 and 77 until enough gas has flowed through the conduit 38 to substantially equalize the pressure in the chambers 31 and 32.

The torch is lighted, and the plate 80 is rocked counter-clockwise to bring the contact 78 against the contact 76. Current flows from the power line through the closed switch 71, conductor 70, relay 64, conductor 74, contacts 78 and 76, conductor 73, contact 84, contact bar 82, contact 83, conductor 85, and switch 42. The relay 64 is energized and draws the contact bar 87 against the contacts 88 and 89 to establish a circuit between the conductors 73 and 74 which is parallel to the circuit through the contacts 76 and 78 so that the relay 64 remains energized after the attendant releases the plate 80 and the contact 78 moves away from the contact 76.

The relay 64 draws the contact bar 68 against the contacts 63 and 69, so that current flows from the contact 69 through the contact bar 68, contact 63, and switch 58, to the solenoid 29. This solenoid, when energized, opens the valve 28 so that oxygen flows to the torch 14.

If there is a flash-back in the torch 14, there is a sudden increase in pressure in the conduit chamber 31 and the diaphragm 35 is flexed upward and moves the connector 36 against the plunger of the switch 42, displacing the plunger and causing the switch to open and break the circuits of both of the relays 61 and 64. As soon as current stops flowing through these relays the contact bars 82, 66, 87 and 68 move away from their adjacent contacts, the supply of power to the solenoids 24 and 29 is cut off, and the valves 20 and 28 close and shut off all gas to the torch. The valves 20 and 28 are preferably located close to the torch so that the volume of gas in the conduits between the valves and the torch is small. This gas expands after the valves close and prolongs the supply to the torch.

A short while after the switch 42 has been opened by a pressure increase resulting from a flash-back, the gas pressure in the chambers 31 and 32 becomes substantially equal and the switch 42 closes. The valves 20 and 28 do not open, however, until the plate 80 is operated to again energize the relays 61 and 64.

The switch 71 can be manually operated at any time to cut off the supply of power to the relays and cause the valves 20 and 28 to close.

The operation of the control apparatus shown in Fig. 5 will be readily understood from the foregoing description of Fig. 1. One special feature of the control apparatus in Fig. 5 is the connection of the switches of the safety devices 30 and 30' in series so that a flash-back at either torch causes the gas to both torches to be shut off. This feature is particularly useful with installations where the two torches face one another and are close together for heating the edges of a narrow, flat skelp which is drawn between the torches. When the skelp is narrow and the torches are close together, the flames of either torch are likely to damage the other if it is not lighted. In case of a flash-back which extinguishes one torch, the control apparatus of Fig. 5 protects the torch from injury by shutting off the supply of gas to the other torch.

The preferred embodiment and some modifications of the invention have been illustrated and described, but other modifications can be made and features of the invention can be used without others.

I claim:

1. Apparatus for shutting off the flow of fluid through a supply line, including a normally closed valve in said line, a holding device for maintaining the valve in open position, and valve control means operated by a sudden change of pressure in the conduit to release said holding device so that the valve, if open, returns to its normally closed position.

2. Apparatus for controlling the supply of gas to a torch, said apparatus comprising a shut-off valve in the conduit through which gas is delivered to the torch, a diaphragm exposed on one side to the pressure in the conduit, a counterbalancing-pressure chamber on the other side of the diaphragm, a restricted port connecting said chamber with the conduit, means mechanically independent of the diaphragm for holding the valve in open position, and means operated by movement of the diaphragm in response to the pressure rise caused by a flash-back for releasing the holding means and closing the shut-off valve.

3. Apparatus for controlling the operation of a torch, including a conduit for supplying gas to the torch, a shut-off valve in the conduit, a diaphragm exposed on one side to the pressure in the conduit, and having a pressure-balancing chamber on its other side with a restricted conduit through which gas flows to and from said chamber to equalize the pressure on both sides of the diaphragm, the rate of flow through said restricted conduit being small so that there is a time lag in the pressure equalization, and means operated by movement of said diaphragm in response to a sudden increase in pressure in the gas supply conduit for causing the valve to close so that the supply of gas is automatically cut off in the event of a flash-back at the torch.

4. Apparatus for controlling the operation of a torch, including a gas conduit for supplying oxygen to the torch and another conduit for supplying fuel gas to said torch, a shut-off valve in each of said gas conduits, a pressure-operated device connected with one of said conduits and responsive to a flash-back of the torch, and means operated by said pressure-operated device to close the shut-off valves in both conduits in the event of a flash-back.

5. Control apparatus for a torch comprising separate valves for controlling the delivery of oxygen and fuel gas to the torch, electric operating means for opening the oxygen valve, other electric operating means for opening the fuel gas valve, switches for controlling the supply of power to the electric operating means, and connections between the circuits of said switches rendering the circuit of the oxygen valve operating means ineffective to cause the oxygen valve to open before the switch has been operated to cause the fuel gas valve to open.

6. Torch control apparatus comprising an oxygen shut-off valve, a fuel gas shut-off valve, an electric motor operatively connected to the oxygen valve to open said valve when the motor is energized, another motor similarly associated with the fuel gas valve, a manually-operated switch in a circuit supplying power to the motor which opens the fuel gas valve, and a second manually-operated switch for closing a circuit to the oxygen valve motor, the circuit of said second switch being connected to a source of power through the first switch so that the oxygen valve can not be opened ahead of the fuel gas valve.

7. Control apparatus for a conduit through which gas is delivered to a torch, including a valve in the conduit, a diaphragm with one side exposed to the pressure of the gas in the conduit and the other side subject to the pressure in a pressure-balancing chamber which communicates with the conduit through a restricted outlet so that there is a time lag in the change of pressure in said chamber in response to a pressure change in the conduit, means for holding the valve open, means for closing the valve, and apparatus between the diaphragm and the valve-closing means for making said valve-closing means operate in response to a movement of the diaphragm by a sudden rise in pressure in the conduit.

8. Control apparatus for a conduit through which gas is delivered to a torch, including a valve in the conduit, a diaphragm with one side exposed to the pressure of the gas in the conduit and the other side subject to the pressure in a pressure-balancing chamber which communicates with the conduit through a restricted outlet so that there is a time lag in the change of pressure in said chamber in response to a pressure change in the conduit, electromagnetic means for holding the valve open, a switch controlling the circuit of said electromagnetic means, and motion-transmitting means operatively connected with the diaphragm and switch for opening said switch in response to a movement of the diaphragm by a sudden rise in pressure in the conduit.

9. Apparatus for controlling the operation of a torch having conduits for delivering oxygen and fuel gas to said torch, said apparatus including a shut-off valve in each of said conduits, control means for opening said valves, safety means operative in one position to prevent the control means from opening the oxygen valve, and operative connections between the safety means and control means, said connections being constructed and arranged to shift said safety means into another position when said control means is operated to open the fuel gas valve.

10. Control apparatus for a torch comprising separate valves for controlling the delivery of oxygen and fuel gas to the torch, means for opening said valves including an electric circuit, a portion of which must be closed to make said apparatus effective to open the oxygen valve, and connections by which operation of the control apparatus to open the fuel gas valve closes said portion of the circuit.

DONALD L. SMITH.